United States Patent
Oda et al.

(10) Patent No.: US 7,149,937 B2
(45) Date of Patent: Dec. 12, 2006

(54) INFORMATION PROCESSING METHOD AND SYSTEM WITH EXECUTION THRESHOLDS ALLOWABLE TO INPUT DATA ERRORS

(75) Inventors: Toshiaki Oda, Yokohama (JP);
Hiroyoshi Tsuchiya, Yokosuka (JP);
Junichiro Takagi, Ebina (JP)

(73) Assignee: Hitachi, Ltd., Tokyo (JP)

( * ) Notice: Subject to any disclaimer, the term of this patent is extended or adjusted under 35 U.S.C. 154(b) by 451 days.

(21) Appl. No.: 10/345,266

(22) Filed: Jan. 16, 2003

(65) Prior Publication Data

US 2003/0158787 A1    Aug. 21, 2003

(30) Foreign Application Priority Data

Feb. 15, 2002   (JP)   ............................. 2002-037605

(51) Int. Cl.
*G06F 11/00* (2006.01)
*H03M 13/00* (2006.01)

(52) U.S. Cl. ...................................................... 714/708

(58) Field of Classification Search ................. 714/708
See application file for complete search history.

(56) References Cited

U.S. PATENT DOCUMENTS 6,662,322 B1 * 12/2003 Abdelilah et al. .......... 714/708
6,812,827 B1 * 11/2004 Laskowsky et al. ... 340/538.15
6,834,358 B1 * 12/2004 Korenevsky et al. ......... 714/15

FOREIGN PATENT DOCUMENTS

JP          A-9-44389          2/1997

* cited by examiner

*Primary Examiner*—Shelly Chase
(74) *Attorney, Agent, or Firm*—Mattingly, Stanger, Malur & Brundidge, P.C.

(57) ABSTRACT

An information processing method is provided which allows each shop in a cyber shopping site to continue its operation even if some errors of merchandise data are found in each of a plurality of data processes. More specifically, an error rate of input merchandise data is calculated at each process, and if the error rate is equal to or larger than a data error allowable threshold value, the next process is performed in order to continue the operation of the shop.

18 Claims, 17 Drawing Sheets

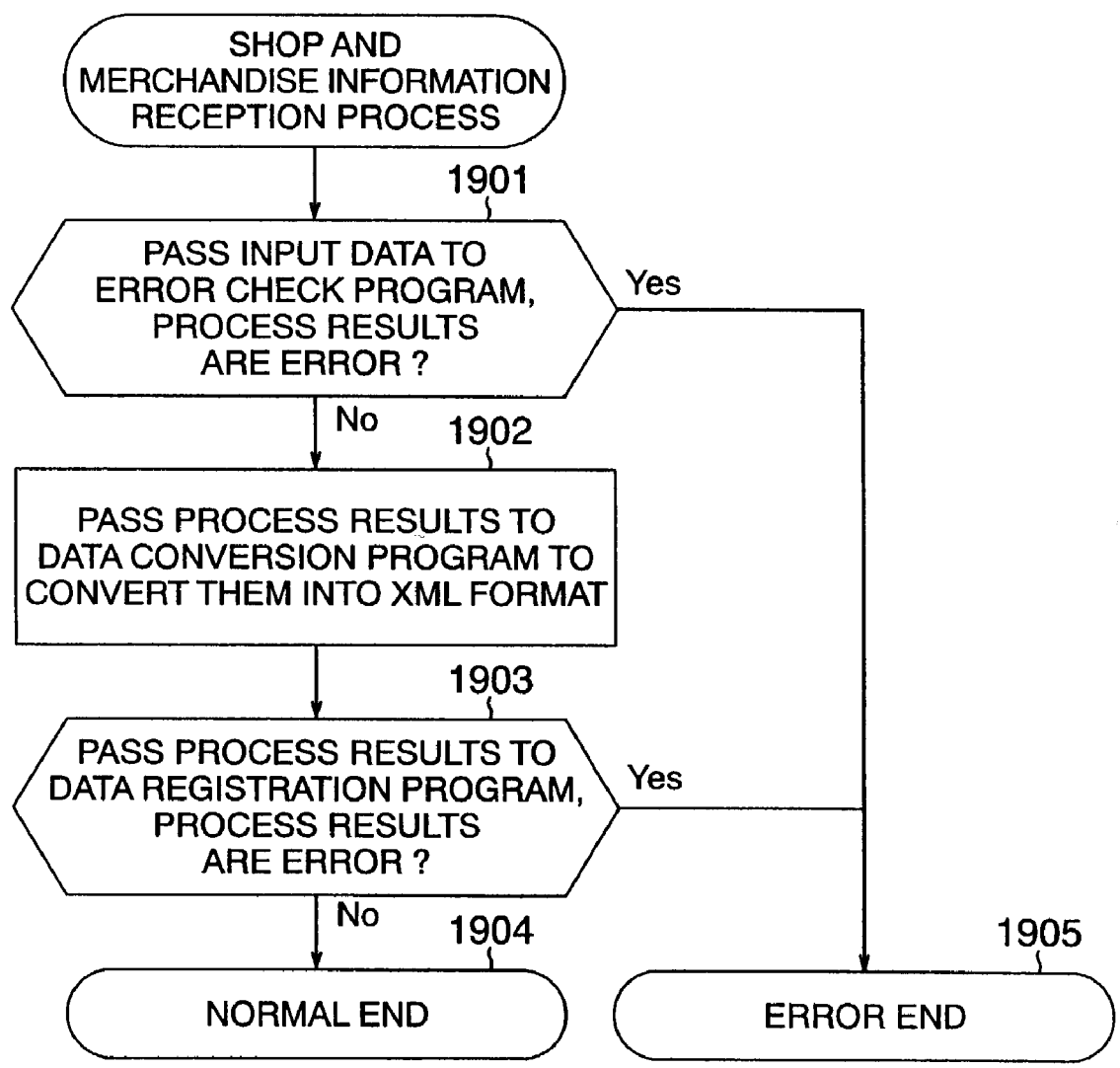

SHOP INFORMATION NAME, SHOP NAME, SHOP ID,
MERCHANDISE INFORMATION NAME,
MERCHANDISE NAME, SHOP ID, PRICE, ⋯ , PRICE

FIG. 4

```
<ecinf>
  <table name = "SHOP">
    <record>                                          402
      <column name = "NAME">HITSHOP</column>
      <column name = "ID">SH01</column>
    </record>                                         403
  </table>
  <table name = "PRODUCT">
    <record>                                          404
      <column name = "NAME">PC-7DM08</column>
      <column name = "ID">SH01</column>               405
      <column name = "PRICE">200000</column>
    </record>                                         406
  </table>
</ecinf>
```
401

FIG. 5

| SHOP INFORMATION NAME | `<table name = "SHOP INFORMATION NAME">` |
|---|---|
| SHOP NAME | `<column name = "NAME">SHOP NAME</column>` |
| SHOP ID | `<column name = "ID">SHOP ID</column>` |
| MERCHANDISE INFORMATION NAME | `<table name = "MERCHANDISE INFORMATION NAME">` |
| MERCHANDISE NAME | `<column name = "NAME">MERCHANDISE NAME</column>` |
| SHOP ID | `<column name = "ID">SHOP ID</column>` |
| PRICE | `<column name = "PRICE">PRICE</column>` |

FIG. 6

| TABLE | COLUMN | ATTRIBUTE |
|---|---|---|
| 601 SHOP | NAME ~603 | CHARACTER TYPE, LENGTH 10, |
| | ID ~604 | NUMERICAL VALUE TYPE, LENGTH 8 |
| 602 PRODUCT | NAME ~605 | CHARACTER TYPE, LENGTH 10, |
| | ID ~606 | NUMERICAL VALUE TYPE, LENGTH 8 |
| | PRICE ~607 | NUMERICAL VALUE TYPE, LENGTH 10 |

FIG. 7

| | |
|---|---|
| 701<br>table, name = "SHOP" | SHOP |
| 702<br>column, name = "NAME"<br>703<br>column, name = "ID" | 708<br>NAME<br>709<br>ID |
| 704<br>table, name = "PRODUCT" | PRODUCT |
| 705<br>column, name = "NAME"<br>706<br>column, name = "ID"<br>707<br>column, name = "PRICE" | 710<br>NAME<br>711<br>ID<br>712<br>PRICE |

FIG. 8

SHOP

| NAME | ID |
|---|---|
| HITSHOP | SH01 |

PRODUCT

| NAME | ID | PRICE |
|---|---|---|
| PC-7DM08 | SH01 | 200000 |

FIG. 11

```
...
<column name = "NAME">PC-7DM08001</column>
...
```
~1101

```
...
<column name = "PRICE">100A</column>
...
```
~1102

```
...
<record>
</record>
...
```
~1103

```
...
<table name = "SHOP">
 <record>
  <column name = "NAME">HITSHOP</column>
  <column name = "ID">SH01</column>
 </record>           1105
</table>
<table name = "PRODUCT">
 <record>
  <column name = "NAME">PC-7DM08</column>
  <column name = "ID">SH02</column>    ~1106
  <column name = "PRICE">200000</column>
 </record>
</table>
...
```
~1104

FIG. 14

```
...
<table name = "PRODUCT">
 <record>
   <column name = "NAME">PC-7DM08</column>
   <column name = "ID">SH01</column>
   <column name = "PRICE">200000</column>
 </record>
 <record>
   <column name = "NAME">PC-7DM09</column>
   <column name = "ID">SH02</column>
   <column name = "PRICE">210000</column>
 </record>
 <record>
   <column name = "NAME">PC-7DM10</column>
   <column name = "ID">SH01</column>
   <column name = "PRICE">300000</column>
 </record>
 ...
</table>
```
~1401

SHOP : HITSHOP

| MERCHANDISE | PRICE |
|---|---|
| PC-7DM08 | 200000 |
| PC-7DM10 | 300000 |

...

~1403 ns
INFORMATION PROCESSING METHOD AND SYSTEM WITH EXECUTION THRESHOLDS ALLOWABLE TO INPUT DATA ERRORS

BACKGROUND OF THE INVENTION

1. Field of the Invention

The present invention relates to information processing for executing a plurality of processes for input data.

2. Description of the Related Art

Under the situation of widespread of the Internet, there is a cyber shopping site system in which merchandise information is registered in a server and shops are opened and managed in a cyber shopping site. This server receives a large amount of merchandise information from merchandise providing clients, rearranges and stores the merchandise information in a database, and supplies a user with merchandise information stored in the database in response to a request from the user.

The database of a cyber shopping site system is shared by merchandise providers and users. In order for the server to provide services, some restrictions are required to be imposed on data to be stored in the database because there are various types of data such as numerical value data of a price and character string data of a merchandise name, respectively contained in merchandise information. It is necessary to deal with merchandise information not overcoming the restrictions as an error.

As described, for example, in JP-A-9-44389, a conventional database optimizing method designates an upper limit of the number of errors and when the number of errors reaches this upper limit, the process is terminated.

However, for example, even if ten merchandise information pieces are error among one thousand merchandise information pieces, the cyber shopping site system can be operated by using the remaining merchandise information. If nine merchandise information pieces are error among ten merchandise information pieces, there is a possibility that the cyber shopping site system cannot be operated.

Whether a cyber shopping site system can be operated cannot be judged simply from the number of errors.

SUMMARY OF THE INVENTION

It is an object of the invention to provide an information processing method for a system solving the above-described problems, the method being able to judge from the error rate of input data whether the process in the system is to be terminated or not.

As one solutions to solving the above object, a cyber shopping site system calculates an error rate of data of each process among various information processes of the system, and if the error rate exceeds a predetermined threshold value, the process is terminated or an alternative process is performed.

Other objects, features and advantages of the invention will become apparent from the following description of the embodiments of the invention taken in conjunction with the accompanying drawings.

BRIEF DESCRIPTION OF THE DRAWINGS

FIG. 1B is a flow chart illustrating a process of registering merchandise information of a cyber shopping site system according to an embodiment of the invention.

FIG. 4 is a diagram showing input data in the XML format.

FIG. 5 is a diagram showing a data conversion table.

FIG. 6 is a diagram showing the data structure of a database.

FIG. 7 is a diagram showing the correspondence between data in the XML format and data in tables in the database.

FIG. 8 is a diagram showing data stored in the database.

FIG. 11 is a diagram showing examples of an error of data in the XML format.

FIG. 14 is a diagram showing data in the XML format and merchandise catalog information.

DETAILED DESCRIPTION OF THE EMBODIMENTS

Prior to describing the embodiments, the fundamental principle of the invention will be described. According to the invention, an information processing system executes a plurality of processes i (i=1, . . . , N) and outputs the process result as output data. The information processing system executes each process i (i=2, . . . , N) by using output data of the preceding process i−1 (i=2, . . . , N). A process stop threshold value r(1) (i=1, . . . , N) is set to each process i (i=1, . . . , N). In each process i (i=1, . . . , N), an error rate e(i) (i=1, . . . , N) of each data set is calculated. If the error rate e(i) (i=1, . . . , N) is equal to or smaller than the corresponding process stop threshold value r(i) (i=1, . . . , N), the process is terminated as a normal end to thereafter execute the next process. If the error rate e(i) (i=1, . . . , N) is larger than the corresponding process stop threshold value r(i) (i=1, . . . , N), the process is terminated as an error end.

For the process i, a predetermined number of sample data elements may be randomly derived from input data by using a general statistical approach, and an estimated error rate of the number of error sample data elements relative to the total number of samples is calculated. Whether the process is terminated as an error end or as a normal end is determined from the following conditions.

(1) If the estimated error rate is larger than the process stop threshold value, the process is terminated as an error end.

(2) If the estimated error rate is equal to or smaller than the process stop threshold value and the actual error rate is larger than the process stop threshold value, the process is terminated as an error end.

(3) If the estimated error rate is equal to or smaller than the process stop threshold value and the actual error rate is equal to or smaller than the process stop threshold value, the process is terminated as a normal end.

As an another method, a weight $w(i,s)$ ($i=1, \ldots, N$, $s=1, \ldots, M$) is set beforehand to each process i, the weight being dependent upon and related to the contents of an error possibly occurring during the process. s is the number assigned to each weight corresponding to each process i, and M is the value of an assigned weight. M is variable for each process.

In counting the number of error elements of each input data set of the process i, the number of error elements is counted by incorporating the weight $w(i,s)$ corresponding to an error item.

Embodiments of the invention will be described with reference to the accompanying drawings.

Figure 1A:
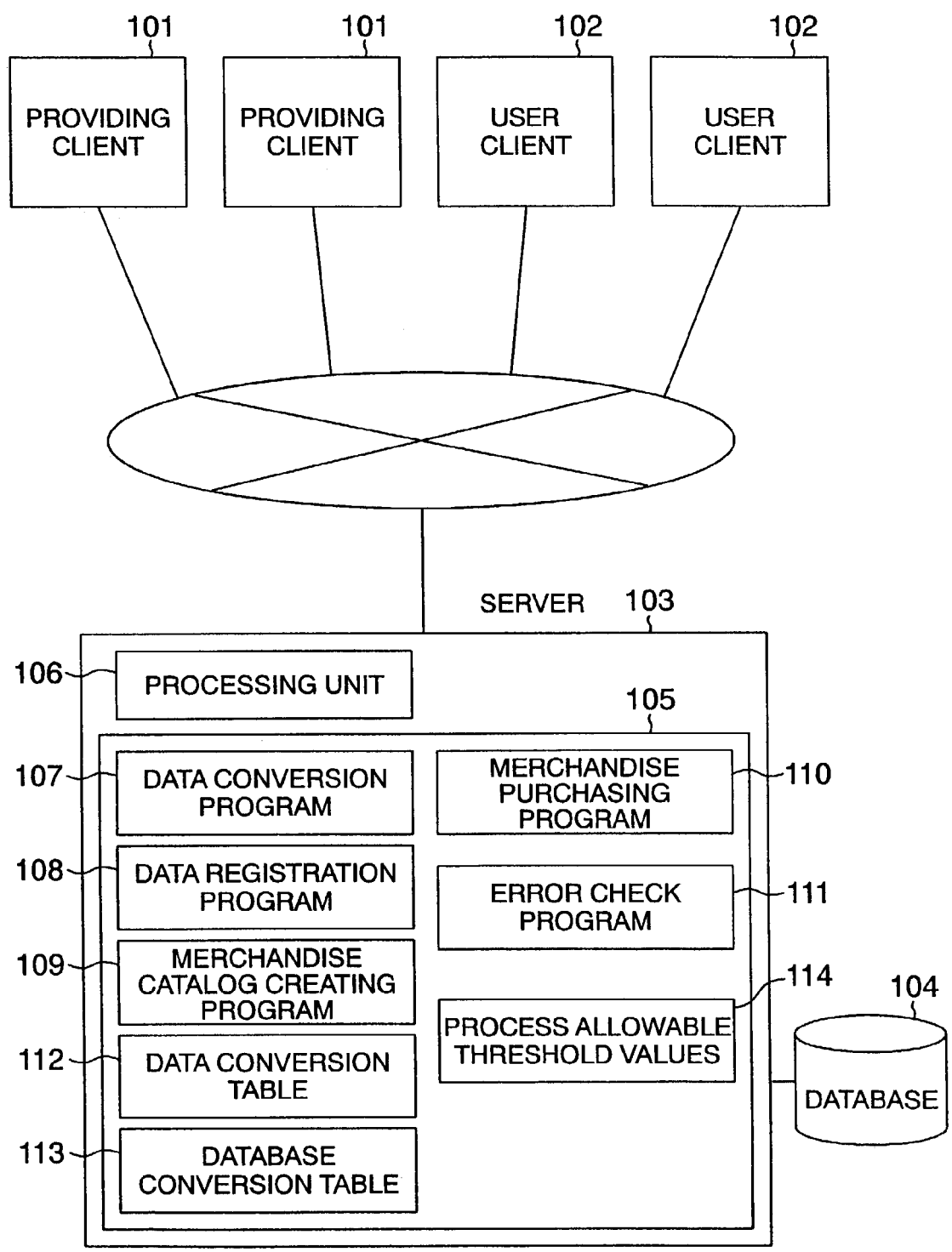
FIG. 1A is a block diagram showing the structure of a system to which the invention is applied.

FIG. 1A shows the structure of a cyber shopping site system. This system has: a plurality of providing clients 101 for providing merchandise information; a plurality of purchasing clients 102 for purchasing a merchandise in accordance with the provided merchandise information; and a server 103 for storing and supplying merchandise information. These clients and server are interconnected via networks.

The server 103 has: a storage unit 105 for storing data and programs; and a processing unit 106 for executing processes in accordance with the programs stored in the storage unit 105. The storage unit 105 stores: a data conversion program 107 for converting data of shop and merchandise information sent from the providing client 101 into data of a predetermined format; a data registration program 108 for storing received data of shop and merchandise information in a database 104; a merchandise catalog creating program 109 for creating a merchandise catalog in accordance with the merchandise information stored in the database 104 in response to a request from the purchasing client 102; a merchandise purchase processing program 110 for executing a process of purchasing a merchandise in response to a request from the purchasing client 102; and an error check program 111 for checking an error of data to be processed by the data conversion program 107. The storage unit 105 also stores: a data conversion table 112 to be used by the data conversion program 107; a database conversion table 113 to be used by the data registration program 108; and process stop threshold value data 114. This process stop threshold value data 114 is set to each of the error check program 111 and data registration program 108. The server 103 is connected to the database 104 for storing shop and merchandise information.

The whole process of the cyber shopping site system is classified into three flow parts capable of parallel operation.

FIG. 1B is a flow chart illustrating a process of registering shop and merchandise information, as the first flow part of the whole process of the cyber shopping site system. In the process shown in FIG. 1B, it is assumed that data of the shop and merchandise information sent from the providing client 101 is written in the Comma Separated Value (CSV) format. In order to start electronic commerce, a user of the providing client 101 sends shop and merchandise information to the server 103. If data of the shop and merchandise information sent from the providing client 101 is written in the CSV format, the server 103 passes this data to the error check program 111 (Step 1901). If the process results are error, the shop and merchandise information registration process is terminated as an error end (Step 1905).

If the process results are normal, the data is passed to the data conversion program 107 to convert the data into data of an eXtensible Markup Language (XML) format (Step 1902). Next, the shop and merchandise information converted into the XML format is passed to the data registration program 108 to register the shop and merchandise information in the database 104 (Step 1903). If the process results of the data registration program 108 are error, the shop and merchandise information registration process is terminated as an error end (Step 1905), whereas if not, the shop and merchandise information registration process is terminated as a normal end (Step 1904). The information processing system for performing a plurality of processes as described earlier in the fundamental principle of the invention, corresponds to the entirety of the cyber shopping site system. Of the plurality of processes, a process 1 ($i=1$) corresponds to the error check program 111 and a process 2 ($i=2$) corresponds to the data registration program 108. This cyber shopping site system of the embodiment corresponds therefore to $N=2$.

The second flow part of the cyber shopping site system is as follows. The server 103 receives a request of creating a merchandise catalog from the purchasing client 102, derives the merchandise information from the database 104, creates merchandise catalog information in the Web page format, and transmits it to the purchasing client 102.

The third flow part of the cyber shopping site system is as follows. The server 103 receives a purchase request from the purchasing client 102, and by using the merchandise purchase program, notifies a reception of a purchase request to the providing client 101 which provided the merchandise. In this embodiment, although input data is written in the CSV format, it may be written in the XML format. In this case, the data is registered in the database 104 without data conversion.

Figures 2, 3:
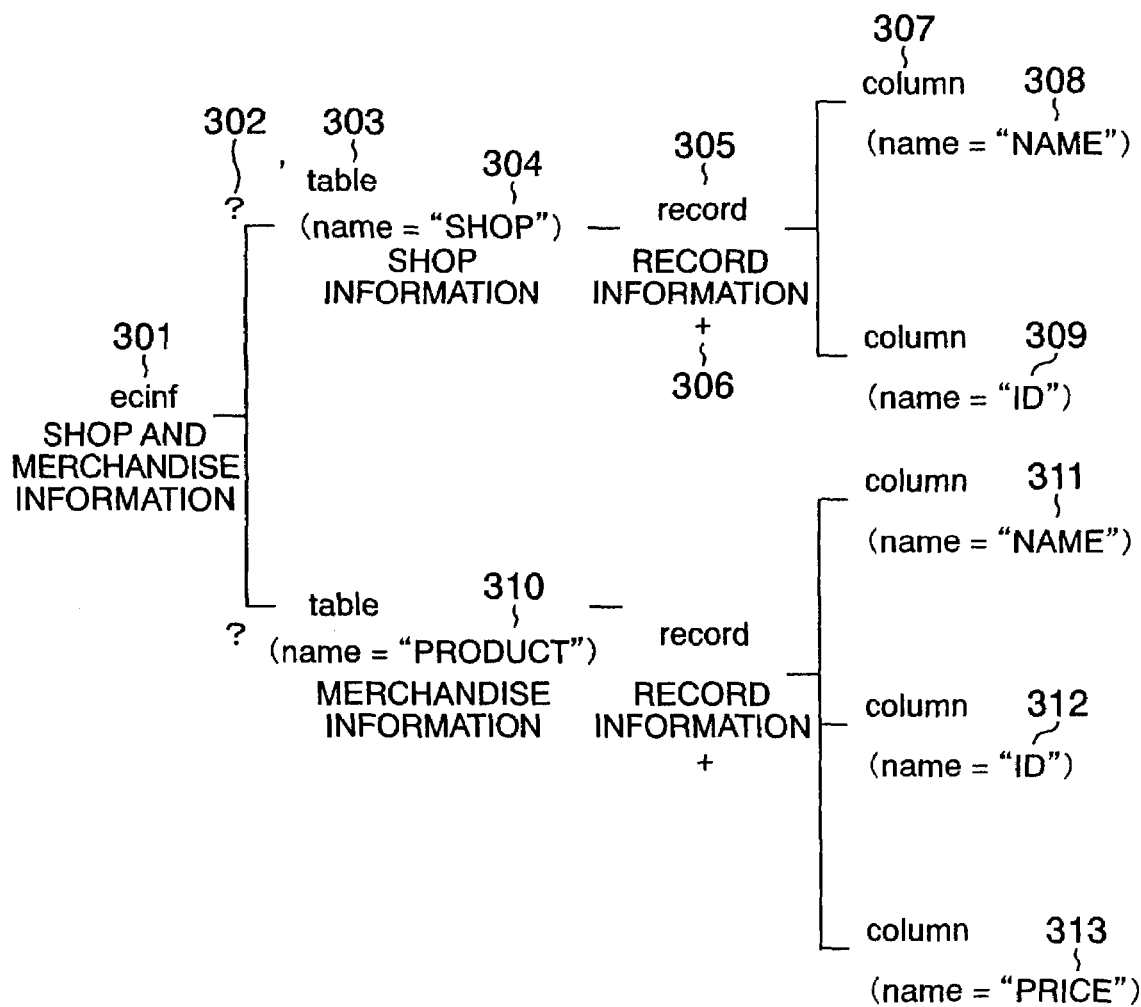
FIG. 2 is a diagram showing an example of input data.
FIG. 3 is a diagram showing the structure of input data in an XML format.

FIG. 2 shows an example of data in the CSV format. As shown, data in the CSV format is a text file in which values (numerical value, text and the like) are delimited by a comma (,). Data in the CSV format is constituted of data such as a shop information name ("SHOP"), a shop name, a shop ID, a merchandise information name ("PRODUCT"), a merchandise name, a shop ID, and a price. The shop information name and merchandise information name are fixed values, "SHOP" and "PRODUCT", respectively. Other data such as a brief comment of a merchandise may also be added.

FIG. 3 shows the data structure in the XML format. A tag "ecinf" 301 is a root tag and contains 0 to 2 tag "table" 303. The tag "table" 303 has an attribute "name". The value of one attribute "name" is "SHOP" 304 representative of shop information. The value of another attribute "name" is "PRODUCT" 310 representative of merchandise information. A symbol "?" 302 indicates that the corresponding tag does not appear or appears once. The tag "table" 303 contains one or more tags "record" each representative of one record. A symbol "+" 306 indicates that the corresponding tag appears once or more. The tag "record" 305 has a tag "column" 307 which has an attribute "name". The tag "record" 305 contained in the shop information has two tags "column" 307. The value of the attribute "name" of the first tag "column" 307 is "NAME" 308 representative of a shop name. The value of the attribute "name" of the second tag "column" 307 is "ID" 309 representative of a unique shop number for identifying the shop. The tag "record" 305 contained in the merchandise information has three tags "column" 307. The value of the attribute "name" of the first tag "column" 307 is "NAME" 311 representative of a merchandise name. The value of the attribute "name" of the second tag "column" 307 is "ID" 312 representative of a shop number to which the merchandise belongs. The value of the attribute "name" of the third tag "column" 307 is "PRICE" 313 representative of the price of the merchandise. The merchandise belonging shop number contained in the record of the merchandise information is required to be coincident with one of the shop numbers contained in the records of the shop information.

FIG. 4 shows an example of the XML data in the XML format corresponding to the format shown in FIG. 3. The shop information has one record, and the shop name and shop number are "HITSHOP" 402 and "SH01" 403, respectively. The merchandise information has one record, and the merchandise name, merchandise belonging shop number and price are "PC-7DMO8" 404, "SH01" 405 AND "200000" 406, respectively. This data shown in FIG. 4 indicates that the merchandise "PC-7DM08" is sold at the shop "HITSHOP" 402.

FIG. 5 shows the data conversion table which shows a correspondence between data in the CSV format and data in the XML format. As shown the shop information name, shop name, shop ID, merchandise information name, merchandise name, ship ID and price in the CSV format are converted into <table name="shop information name">, <column name="NAME">shop name</column>, <column name="ID">shop ID</column>, <table name="merchandise information name">, <column name="NAME">merchandise name</column>, <column name="ID">shop ID</column>, and <column name="PRICE">price</column>, respectively. This data conversion table can be altered so that it can deal with the case wherein data in the CSV format or data in the XML format is changed.

FIG. 6 shows the structure of data to be stored in the database 104. In the database 104, two tables "SHOP" 601 and "PRODUCT" 602 are defined. The shop table "SHOP" 601 is constituted of a "NAME" column 603 representative of a shop name and an "ID" column 604 representative of a shop number. The "NAME" column 603 has attributes of a character type and a length of 10, and the "ID" column 604 has attributes of a numerical value type and a length of 8. The merchandise table "PRODUCT" 602 is constituted of a "NAME" column 605 representative of a merchandise name, an "ID" column 606 representative of a shop number and a "PRICE" column 607 representative of a price. The "NAME" column 605 has attributes of a character type and a length of 10, the "ID" column 606 has a numerical value type and a length of 8, and the "PRICE" column 607 has a numerical value type and a length of 10.

FIG. 7 shows the correspondence between data of the XML format and data in the tables of the database. The value of the tag "column" 702 having the attribute "name" value of "NAME" in the tag "record" under the tag "table" 701 having the "name" attribute value of SHOP"is stored in the "NAME" column 708 of the table "SHOP". The value of the tag "column" 703 having the attribute "name" value of "ID" in the tag "record" is stored in the "ID" column 709 of the table "SHOP". The value of the tag "column" 705 having the attribute "name" value of "NAME" in the tag "record" under the tag "table" 704 having the "name" attribute value of "PRODUCT" is stored in the "NAME" column 710 of the table "PRODUCT". The value of the tag "column" 706 having the attribute "name" value of "ID" in the tag "record" is stored in the "ID" column 711 of the table "PRODUCT". The value of the tag "column" 707 having the attribute "name" value of "PRICE" in the tag "record" is stored in the "PRICE" column 712 of the table "PRODUCT".

FIG. 8 shows the output results when the shop and merchandise information 401 shown in FIG. 4 is registered in the database 104.

Figure 9:
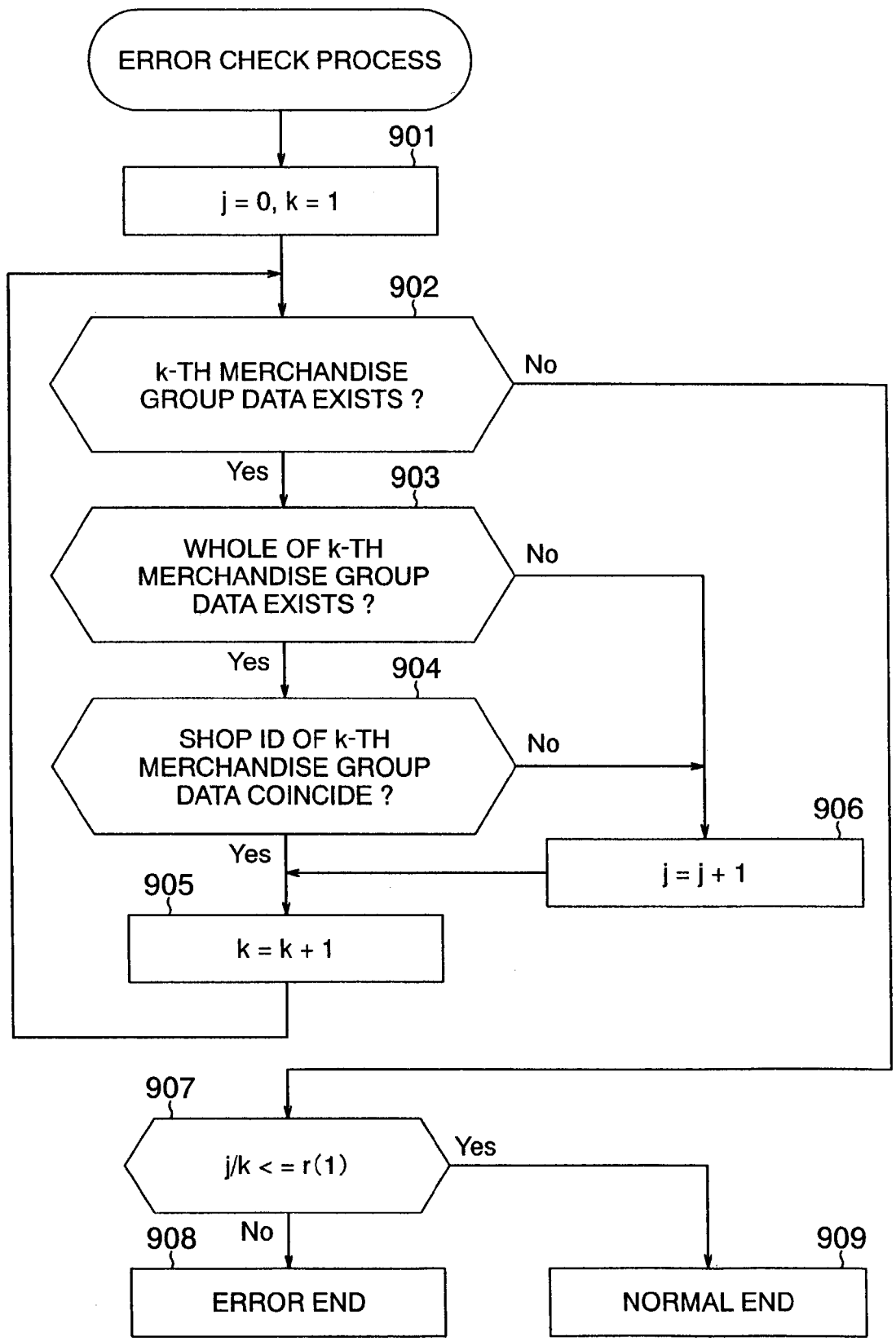
FIG. 9 is a flow chart illustrating an error check process.

FIG. 9 is a flow chart illustrating the process to be executed by the error check program 111.

The data in the CSV format in this embodiment is constituted of the shop information name, shop name, shop ID, merchandise information name, merchandise name, shop ID and price, as described with reference to FIG. 2. If two merchandises are included, the data is constituted of the shop information name, shop name, shop ID, merchandise information name, merchandise name, shop ID, price, merchandise information name, merchandise name, shop ID and price. Information of one merchandise is constituted of four data sets of the merchandise information name, merchandise name, shop ID and price delimited by the top merchandise information name. This four data sets are called "merchandise group data" hereinafter.

First, k indicating the number of merchandises is set to 1 and j indicating the number of errors is set to 0 (Step 901). Next, it is checked whether there is the k-th merchandise group data (Step 902). If there is the k-th merchandise group data, it is judged whether there are the data of the merchandise information name, merchandise name, shop ID and price (Step 903). This judgement is made in accordance with the number of data sets because it can be known from the conversion table shown in FIG. 5 that one piece of merchandise group data is constituted of four data sets. If it is judged that some of the merchandise group data do not exist, the error number is incremented by 1 (Step 906). If it is judged that the whole of the merchandise group data exists, it is judged whether the shop ID contained in the merchandise group data is coincident with the shop ID contained in the shop information (Step 904). If the shop ID's are not coincident, the error number is incremented by 1 (Step 906). If the shop ID's are coincident, k is incremented by 1 to thereafter return to Step 902 (Step 905). If it is judged at Step 902 that the k-th merchandise group data does not exist, an error rate (j/k) is calculated from the total number k of merchandises and the error number j (Step 907), and the error rate is compared with a process stop threshold value r(1). If the error rate is equal to or smaller than the process stop threshold value r(1), the process is terminated (Step 909), whereas if not, an occurrence of an error is notified to the client 101 which provided the shop and merchandise-information (Step 908).

If an error does not occur in the process executed by the error check program 111, the data conversion program 107 converts data in the CSV format shown in FIG. 2 into data of the XML format shown in FIG. 4.

Figure 10:
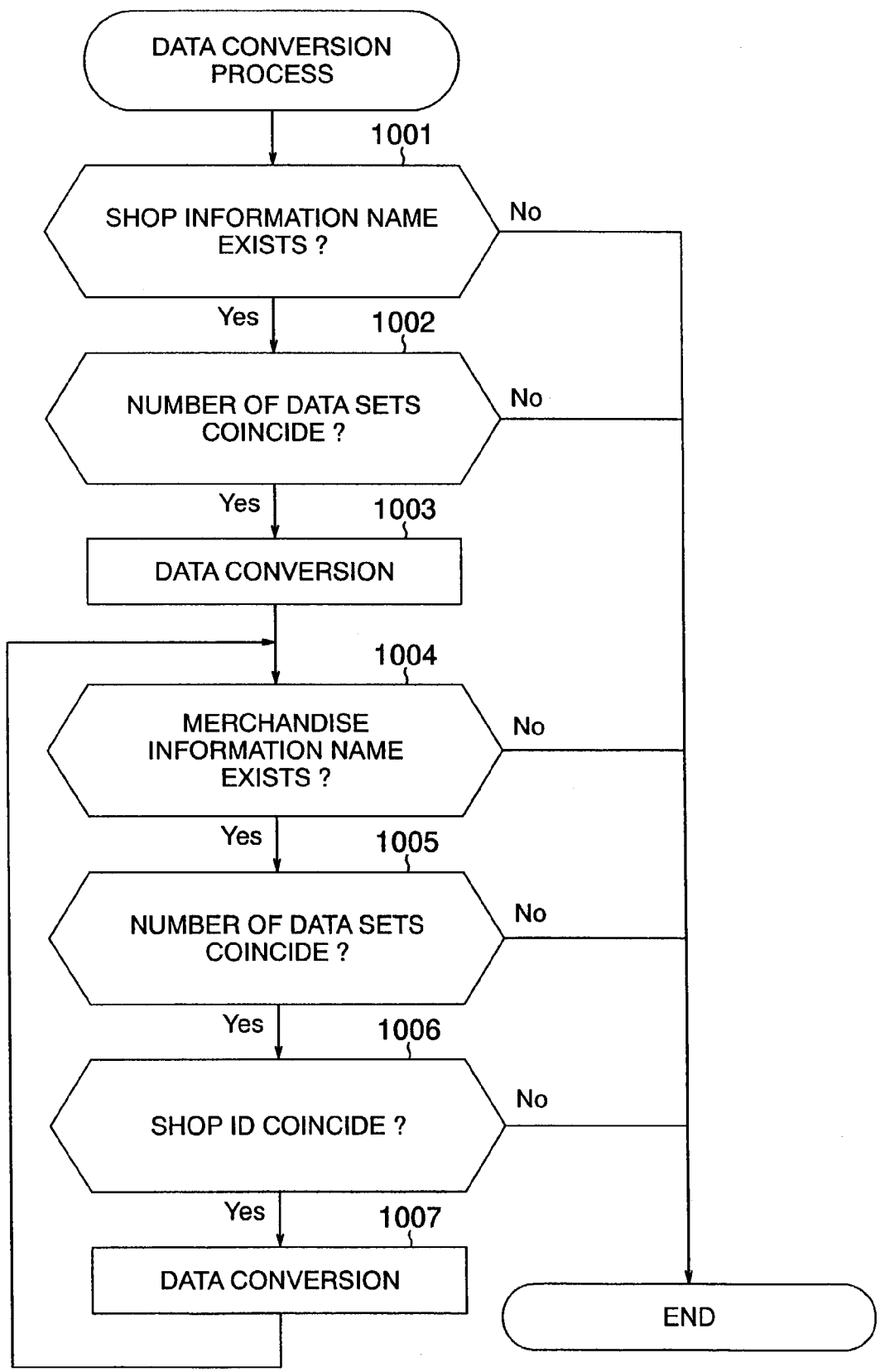
FIG. 10 is a flow chart illustrating a data conversion process.

FIG. 10 is a flow chart illustrating the process to be executed by the data conversion program 107.

After data is input, it is judged whether the shop information name exists (Step 1001). If the shop information name exists, it is checked whether the number of data sets (in this embodiment, two data sets of shop ID and shop name) contained in the shop information is coincident with the number of data sets set in the conversion table shown in FIG. 5 (Step 1002). If the numbers of data sets are coincident, the data in the CSV format including the shop information name, shop ID and shop name are converted into data in the XML format by using the conversion table shown in FIG. 5 (Step 1003). Next, it is judged whether the merchandise information name exists (Step 1004). If the merchandise information name exists, it is checked whether the number of data sets (in this embodiment, three data sets of merchandise name, shop ID and price) contained in the merchandise information is coincident with the number of data sets set in the conversion table shown in FIG. 5 (Step 1005). Next, it is checked whether the shop ID contained in the merchandise information is coincident with the shop ID contained in the shop information (Step 1006). If the shop ID's are coincident, the data in the CSV format including the merchandise information name, merchandise name, shop ID and price are converted into data in the XML format by using the conversion table shown in FIG. 5 (Step 1007). With the precess illustrated in FIG. 10, data in the CSV format can be converted into data in the XML format.

A process of registering the data in the XML format in the database 104 to be executed by the data registration program 108 will be described.

First, an error during the process of registering data in the XML format in the database 104 will be described.

FIG. 11 shows errors occurred when data in the XML format was registered in the database 104.

(1) The length of the value of a tag in the record is longer than the length of the column defined in the database as a registration destination. For example, even if the length of the column is defined as 10, a value longer than 10 is designated (1101).

(2) The value of the tag in the record does not match the type of the column defined in the database as the registration destination. For example, even if the value of the column is defined as a numerical value type, a value other than the numerical value is designated (1102).

(3) A necessary tag does not exist in the record (1103).

(4) If the record is a merchandise information record and a record having the same shop number as that in the merchandise information record is not contained in the shop information. For example, in the example (1104) shown in FIG. 11, only one record exists in the shop information and the shop number is "SH01" (1105). A record having the same shop number as the shop number "SH02" (1105) of the record in the merchandise information does not exist in the shop information.

In the following, this check of whether a record having the same shop number as that in the record of the merchandise information exists in the shop information, is called an associated check of a record in the merchandise information. A record having the same shop number as that in the record of the merchandise information and existed in the shop information as judged from the associated check, is called an associated record. If the associated record of the record in the merchandise information exists, it is regarded as normal, whereas if not, it is regarded as error. If the associated check result is error, the record in the shop information or the associated record of the record in the merchandise information is not regarded as error, but the record in the merchandise information is regarded as error. The associated check is a necessary check and is not a sufficient check. Namely, it cannot be always said that the merchandise belongs to the shop of the associated record even if the associated check of the record in the merchandise information is normal. An error of the associated check poses, however, an incontestable problem.

Figure 12:
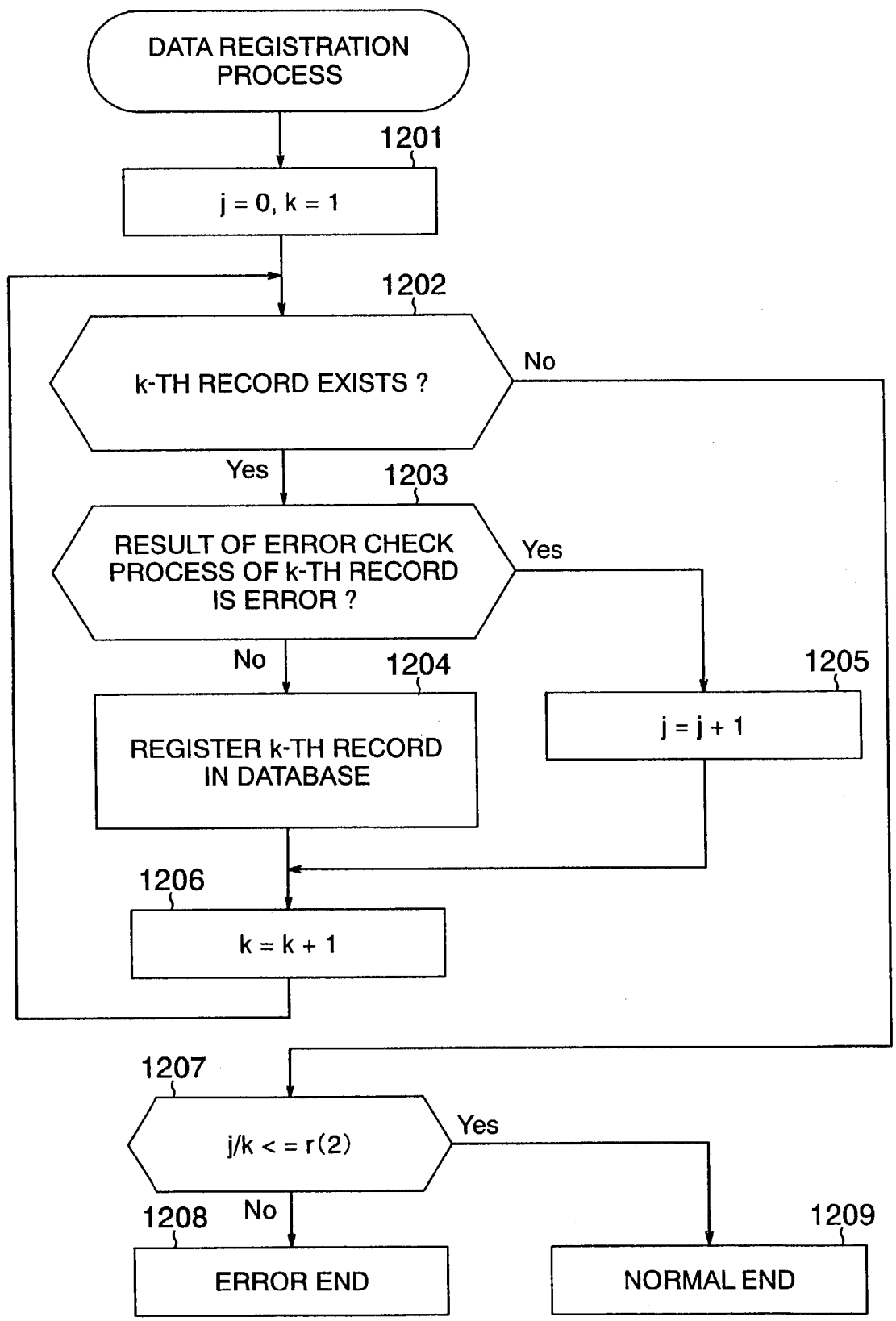
FIG. 12 is a flow chart illustrating a data registration process.

FIG. 12 is a flow chart illustrating the process to be executed by the data registration program 108. The number j of error records in input data and the total number k of records are initialized to 0 and 1, respectively (Step 1201). It is checked whether the tag "table" of the shop and merchandise information of input data has a k-th record (Step 1202). If Yes, the flow advances to Step 1203, whereas if No, the flow skips to Step 1207. The sequential order of records is assumed to be the order of tags "record" appearing first in the shop information and then in the merchandise information. At Step 1203, the k-th record is passed to the error check process to check whether the check result is error. If Yes, the flow branches to Step 1205, whereas if No, the flow advances to Step 1204. At Step 1204, the record is registered in the corresponding table of the database to thereafter advance to Step 1206. At Step 1205, j is incremented by 1 to thereafter advance to Step 1206. At Step 1206, k is incremented by 1 to thereafter return to Step 1202. At Step 1207, it is checked whether the value of j divided by k, i.e., an error rate, is equal to or smaller than a process stop threshold value r(2). If j/k is equal to or smaller than the process stop threshold value r(2), the process is terminated as a normal end (Step 1209), whereas if not, the process is terminated as an error end (Step 1208).

Figure 13:
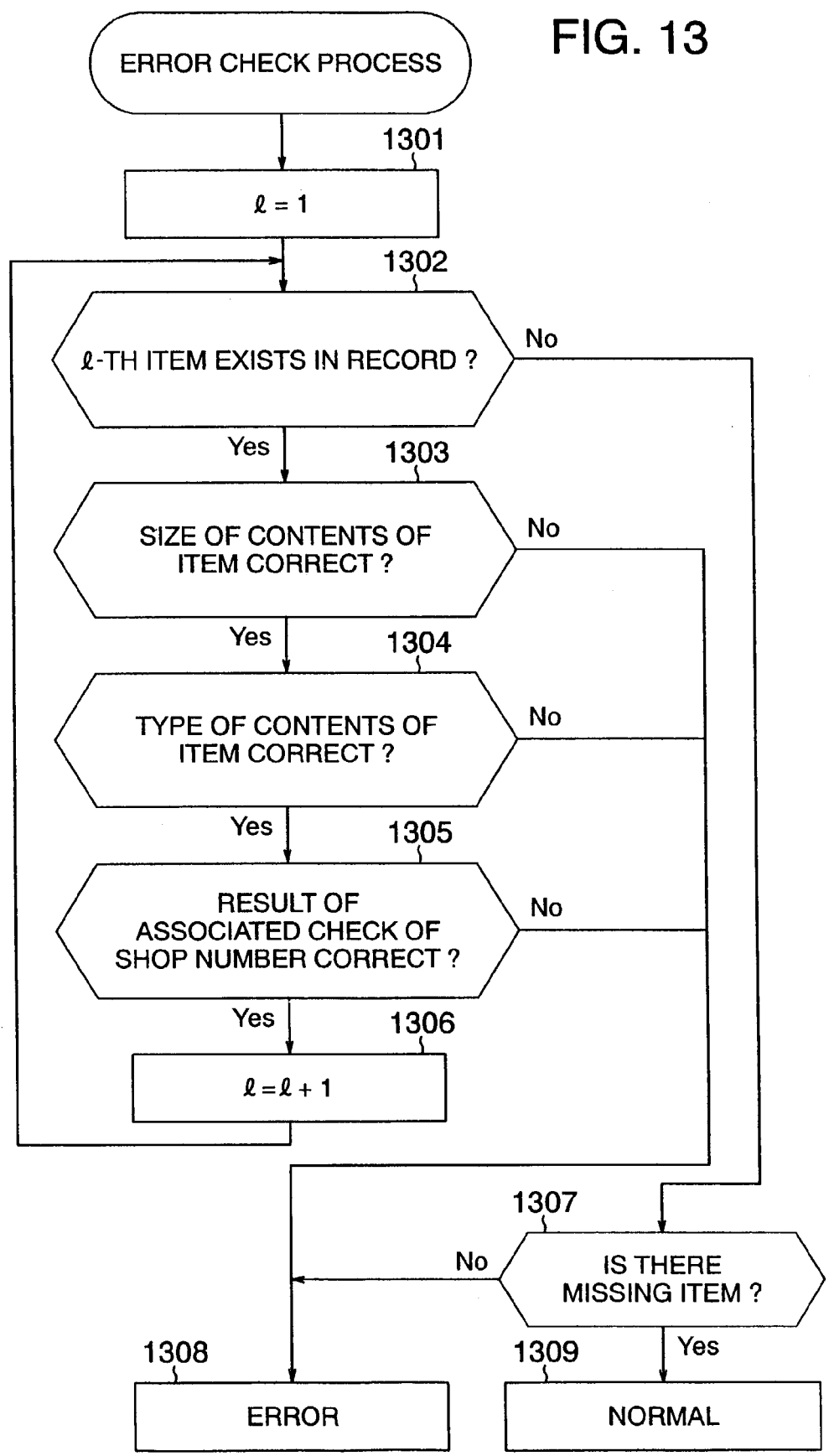
FIG. 13 is a flow chart illustrating an error check process.

FIG. 13 is a flow chart illustrating the error check process of checking whether each record is error. A value l representative of the number of items in the passed record is initialized to 1 (Step 1301). It is checked whether the l-th item exists in the record (Step 1302). If Yes, the flow advances to Step 1303, whereas if No, the flow skips to Step 1307. At Step 1303, it is checked whether the size of the contents of the item is correct. This Step judges whether the above-described error factor (1) corresponds to the reason of the error. If Yes, the flow advances to Step 1304, whereas if No, the flow skips to Step 1308 to terminate the process because of the error. At Step 1304, it is checked whether the type of the contents of the item is correct. This Step judges whether the above-described error factor (2) corresponds to the reason of the error. If Yes, the flow advances to Step 1305, whereas if No, the flow skips to Step 1308 to terminate the process because of the error. At Step 1305 if the item is the shop number of the record of the merchandise information, the associated check of the record of the merchandise information is performed. Even if the associated check is normal, the record of the merchandise information is judged as error if the associated record of the record of the merchandise information is error. This Step judges whether the above-described error factor (4) corresponds to the reason of the error. If Yes, the flow advances to Step 1306, whereas if No, the flow skips to Step 1308 to terminate the process because of the error. At Step 1306, the value l is incremented by 1 to thereafter return to Step 1302. At Step 1307 it is checked whether there is a missing item. This Step judges whether the above-described error factor (3) corresponds to the reason of the error. If Yes, the flow advances to Step 1309 to terminate the process as a normal end, whereas if No, the flow advances to Step 1308 to terminate the process as an error end.

FIG. 14 shows data 1401 in the XML format to be registered in the database and merchandise catalog information 1403 corresponding to the data in the XML format.

The merchandise catalog information 1403 in the Web page format is created by the merchandise catalog creating program 109 in response to a request from a user of the purchasing client 102. More specifically, upon reception of the condition (shop or merchandise) of creating a merchandise catalog from the purchasing client 102, the server 103 activates the merchandise catalog creating program 109. The merchandise catalog creating program 109 searches the database 104 in accordance with the received condition, and creates the merchandise catalog information in the Web page (HTML) format 1403 shown in FIG. 14 from the search result. In the example shown in FIG. 14, the database 104 is searched by using the shop as the search condition. The server 103 sends the merchandise catalog information in the Web page format to the requesting purchasing client 102.

If the user wants to purchase the merchandise displayed on the purchasing client 102, the user designates the merchandise in the merchandise catalog information displayed on the purchasing client 102. The designated merchandise information is sent to the server 103 which in turn activates the merchandise purchasing program 110 to send the merchandise information to the providing client 101 which provides the merchandise. In accordance with the merchandise information, the merchandise provider at the providing client 101 delivers the merchandise to the purchaser.

In the cyber shopping site system of this embodiment, a plurality of providing clients used by merchandise providers are connected. Assuming that one providing client supplies one piece of shop and merchandise information, a plurality of shops can be managed by the server. A plurality of merchandise information pieces can be associated with one shop. For example, if one hundred pieces of merchandise information are associated with one shop and even if data of one merchandise information piece is error, the shop can be managed with the remaining ninety nine pieces of the merchandise information. Namely, the important judgement factor for the shop management is the number of errors per all merchandises rather than the number of errors of merchandise information.

As described above, according to the invention, the process stop is judged from the error rate of data so that data conversion and registration suitable for shop management are possible.

Since data is checked at each process, the total process can be performed at high speed. It takes a long time to perform data conversion and data registration into the database for a plurality of shop and merchandise information pieces. However, according to the invention, shop and merchandise information having an error rate during data conversion higher than a threshold value is not registered in the database. The time required for registration in the database can be shortened correspondingly.

In the cyber shopping site system, if the server 103 is arranged to be able to receive both data in the CSV format and data in the XML format, the data in the XML format can be registered in the database without data conversion. An error check of data is performed at each process so that the error check can be performed for those data whose process routes are different.

The data error check may be performed by another process as in the data conversion process or by a partial process contained in the data registration process.

Next, a second embodiment will be described which has a process of calculating an estimated error rate through sample examination.

Figure 15:
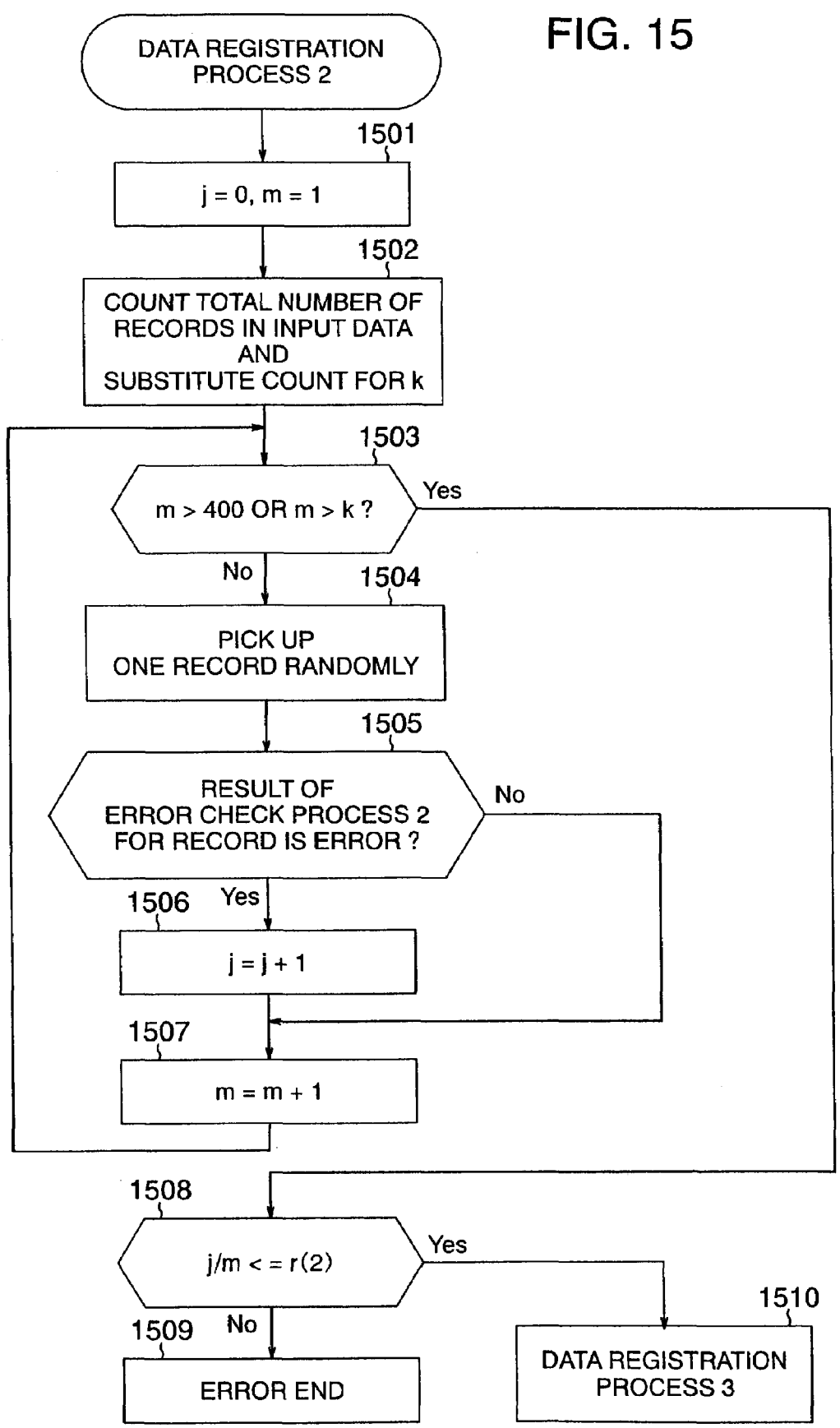
FIG. 15 is a flow chart illustrating another data registration process 2.
Figure 16:
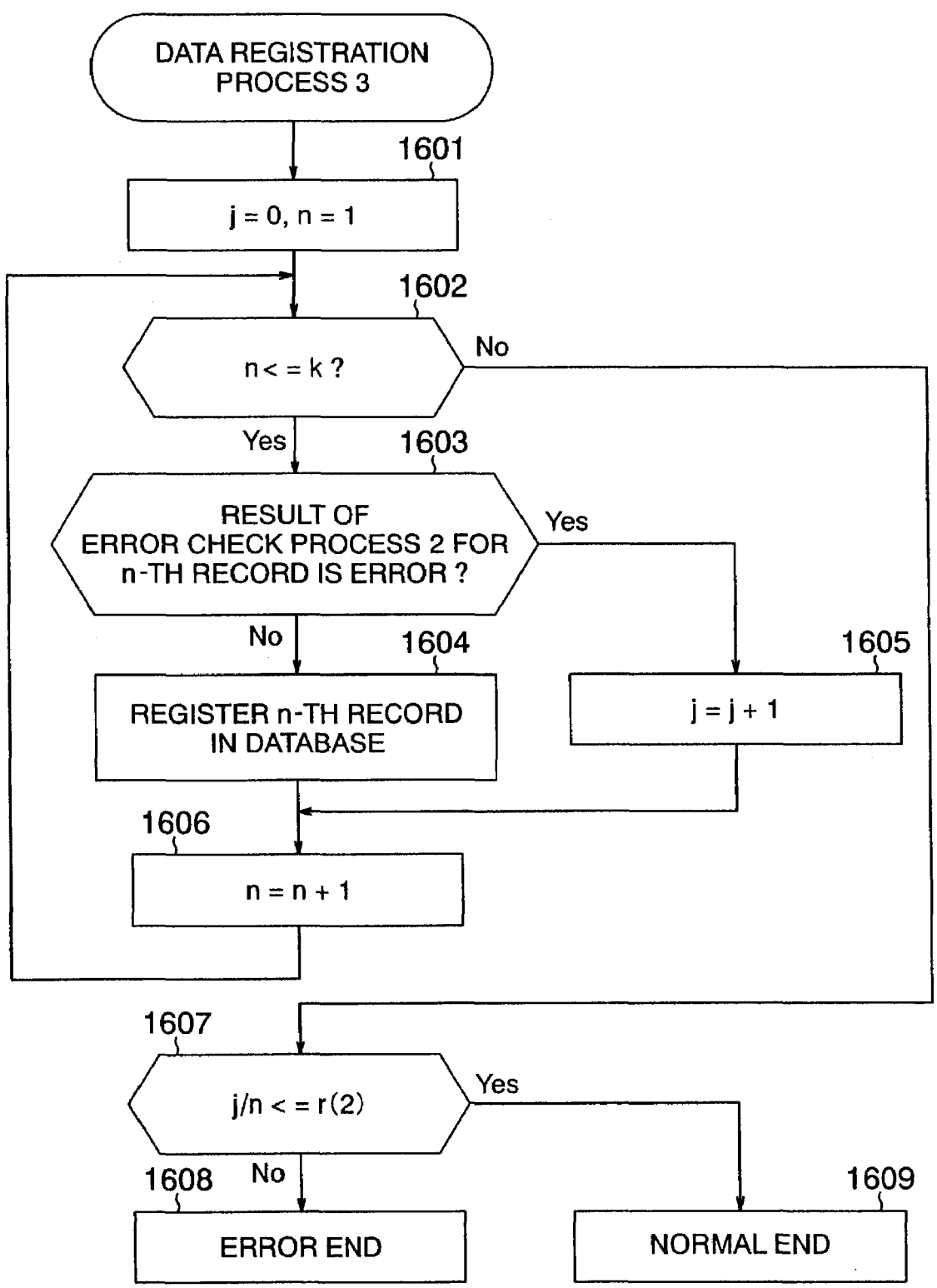
FIG. 16 is a flow chart illustrating another data registration process 3.
Figure 17:
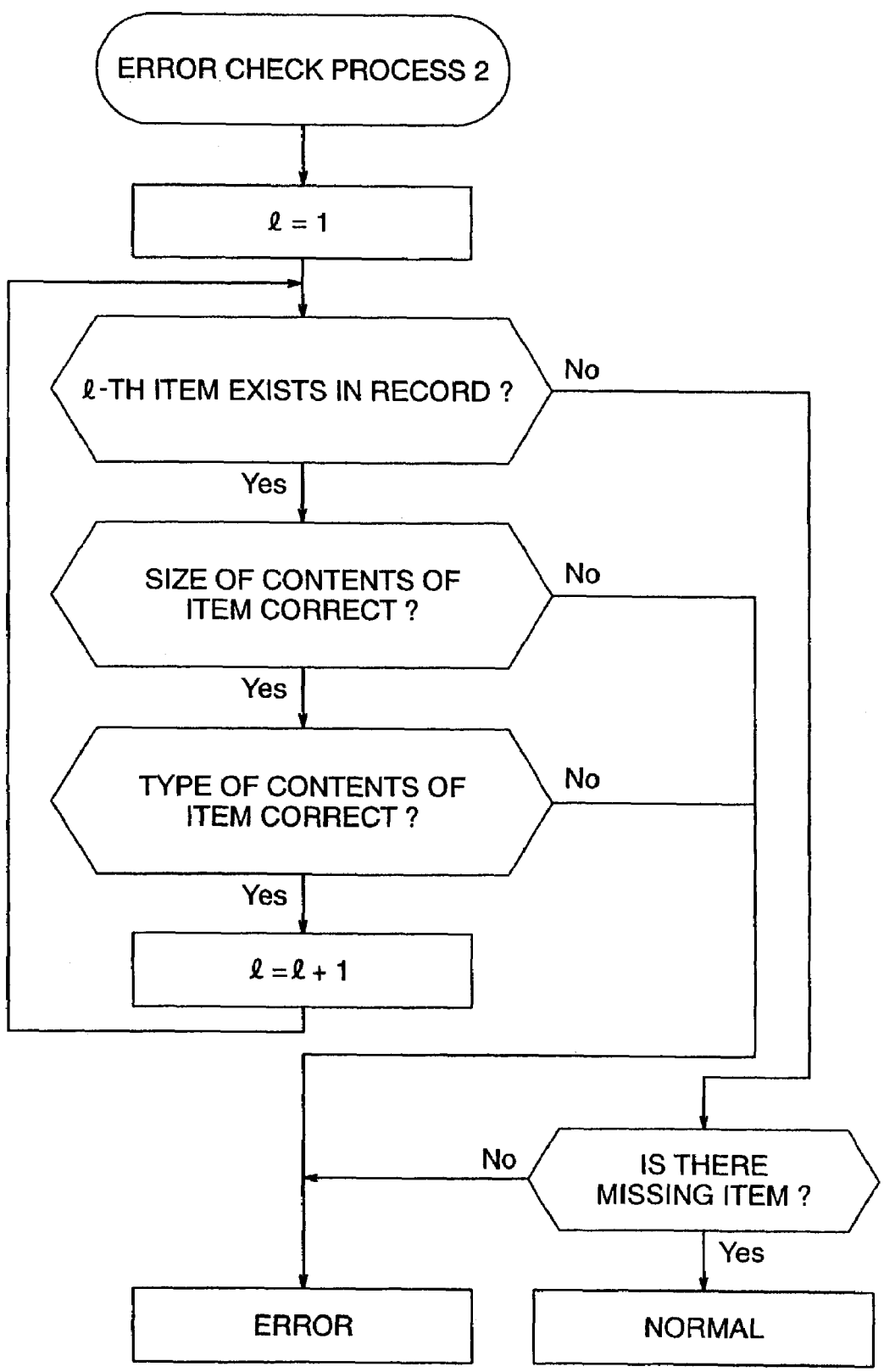
FIG. 17 is a flow chart illustrating another error check process 2.

FIGS. 15 to 17 are flow charts illustrating another process to be executed by the data registration program. With this process, an estimated error rate is obtained through sample examination, and if the estimated error rate is smaller than the threshold value r(2), data is registered. Input data is applied to the case wherein respective records are independent such as input data of only shop information.

FIG. 15 is a flow chart illustrating a process of acquiring samples from input data and obtaining an estimated error rate for the data registration process. The number m of records to be acquired from input data as samples and the number j of error records of the samples are initialized to 1 and 0, respectively (Step 1501). Next, the total number of records in the input data is counted and set to k (Step 1502). It is judged from the rule of thumb whether the sample number m is larger than, for example, 400 or larger than k (Step 1503). If Yes, the flow skips to Step 1508, whereas if No, the flow advances to Step 1504. The total record number k is an integer, for example, 10,000. At Step 1504 one record is randomly picked up from the input data. It is assumed that the record to be picked up is a record different from those already picked up. It is checked whether the result of an error check process 2 for the record is error (Step 1505). If Yes, the flow advances to Step 1506, whereas if No, the flow skips to Step 1507. At Step 1506, j is incremented by 1. At Step 1507 m is incremented by 1 to thereafter return to Step 1503. At Step 1508 it is judged whether a value of j divided by m, i.e., the estimated error rate, is equal to or smaller than the process stop threshold value r(2). If Yes, the flow advances to Step 1510, whereas if No, the process is terminated as an error end (Step 1509). At Step 1510, a data registration process 3 shown in FIG. 16 is performed.

FIG. 16 is a flow chart of the data registration process 3 of registering each record in the input data in the database. The number j of error records in input data and the sequential order n of records to be processed are initialized to 0 and 1, respectively (Step 1601). It is judged whether n is equal to or smaller than k (Step 1602). If Yes, the flow advances to Step 1603, whereas if No, the flow branches to Step 1607. At Step 1603, the error check process 2 is called for the n-th record in the tag "table" of the shop and merchandise information in the input data, and it is judged whether the result of the error checks process 2 is error. If Yes, the flow branches to Step 1605, whereas if No, the flow advances to Step 1604. The sequential order of records is the same as the sequential order described with reference to the flow chart shown in FIG. 12. At Step 1604, the record is registered in the corresponding table of the database to thereafter advance to Step 1606. At Step 1605 j is incremented by 1. At Step 1606 n is incremented by 1 to thereafter return to Step 1602. At Step 1607, it is judged whether the value of j divided by n, i.e., the error rate, is equal to or smaller than r(2). If Yes, the flow is terminated as a normal end (Step 1609), whereas if No, the flow is terminated as an error end (Step 1608).

FIG. 17 is a flow chart illustrating the error check process 2 of checking whether a designated record is error at Step 1505 shown in FIG. 15 and at Step 1603 shown in FIG. 16. This process is similar to the process shown in FIG. 13 excepting that Step 1305 is omitted. Step 1305 shown in FIG. 13 is omitted because the input data is only independent records not related to each other.

In the flow chart shown in FIG. 12, it is not essential to calculate the error rate only after the total number of error records in the input data is know as at Step 1207 shown in FIG. 12. Instead, the error rate may be calculated each time the number of error records in the input data is renewed.

Figure 18:
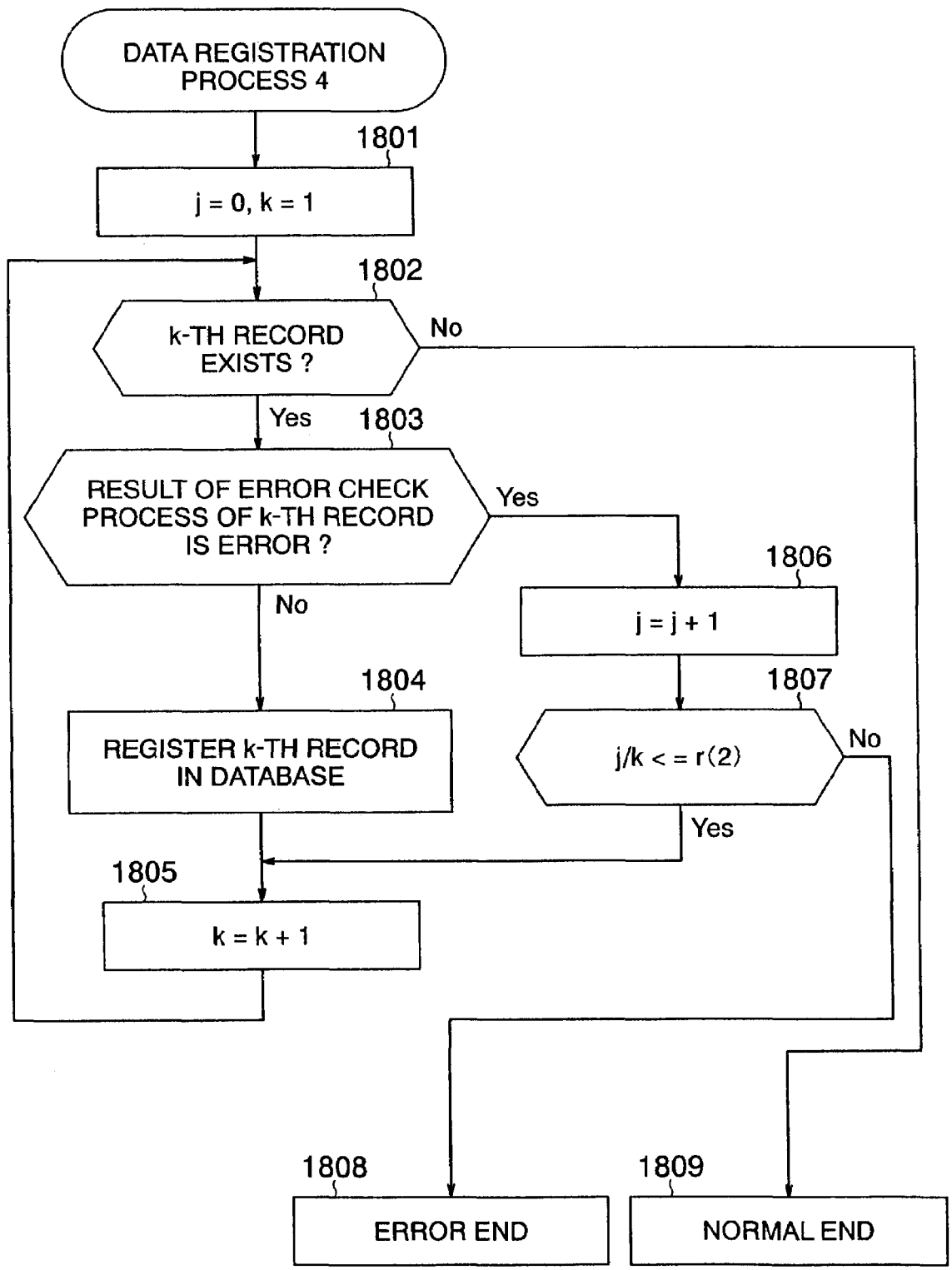
FIG. 18 is a flow chart illustrating another data registration process 4.

FIG. 18 is a flow chart illustrating a data registration process 4 in which the error rate is calculated each time the number of error records in the input data is renewed. The number j of error records in input data and the total number k of records are initialized to 0 and 1, respectively (Step 1801). It is checked whether the tag "table" of the shop and merchandise information of input data has a k-th record (Step 1802). If Yes, the flow advances to Step 1803, whereas if No, the flow is terminated as a normal end (Step 1809). The sequential order of records is the same as the sequential order described with FIG. 12. At Step 1803, the k-th record is passed to the error check process to check whether the check result is error. If Yes, the flow branches to Step 1806, whereas if No, the flow advances to Step 1804. At Step 1804, the record is registered in the corresponding table of the database to thereafter advance to Step 1805. At Step 1806, j is incremented by 1. At Step 1807, it is checked whether the value of j divided by k, i.e., an error rate, is equal to or smaller than r(2). If Yes, the flow advances to Step 1805, whereas if No, the flow is terminated as an error end (Step 1808). At Step 1805, k is incremented by 1 to thereafter return to Step 1802 to repeat the above-described Steps.

Figure 19:
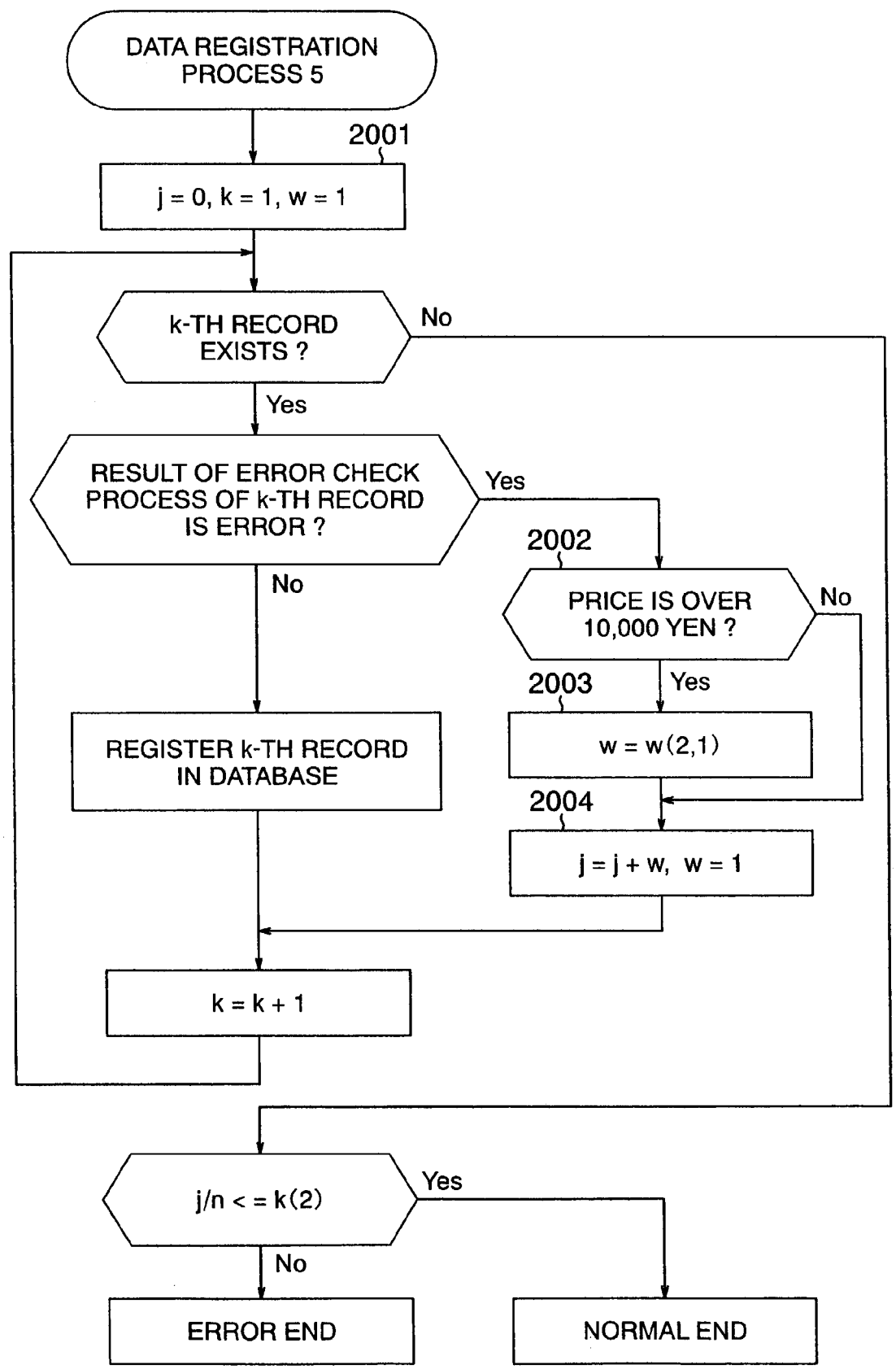
FIG. 19 is a flow chart illustrating a modification of the data registration process shown in FIG. 12.

FIG. 19 is a flow chart illustrating another data registration process 5 to be executed by the data registration program. This data registration process incorporates weights into the data registration process shown in FIG. 12. Only Steps 2001, 2002, 2003 and 2004 shown in FIG. 19 are different from those shown in FIG. 12, and other processes are similar to those shown in FIG. 12.

A weight w(2,1) is set beforehand to the data registration program. In this example, as described earlier, s=1 is set as the weight of the process i=2. In this example, M is 1. At Step 2001, the variable w representative of the weight of a record to be processed is initialized to 1. If the result of the error check process is error, then at Step 2002 it is checked whether the record is the merchandise information and the price is 100,000 Yen or higher. If Yes, the weight w(2,1) is set to w at Step 2003. At Step 2004 the set w is added to j. For the next record processing, w is initialized to 1.

For example, in the data registration process under the conditions of w(2,1)=2, r(2)=0.1 and the total number of records=100, the data registration process is terminated as an error end if there are six error records of the expensive merchandises having a price of 100,000 Yen or higher. This process is appropriate for the shop which sells mainly expensive merchandises. Even if there are nine error records of cheap merchandises having a price lower than 100,000 Yen, the data registration process is not terminated as an error end. It is possible to reflect the degree of seriousness of error contents upon the system management.

According to the invention, in a system for performing a series of processes relative to input data to obtain final output data, an error rate of each input data set of each process is compared with a process stop threshold value to thereby judge whether an operation of the system is terminated or not. If the detected error rate is an allowable value, the final output data can be acquired. Conversely if the detected error rate is not an allowable value, an operation of the system can be terminated. According to another aspect, an estimated error rate is obtained beforehand so that a success or failure of each process by the system can be anticipated. Even if the total process takes a long time, it is possible to judge at an earlier stage whether input data is to be checked for error element correction.

When an error element is counted at each process, a weight dependent upon the error contents is added. Since the detected error rate reflecting the error contents can be obtained, the degree of seriousness of the error contents can be reflected upon the system management.

As described so far, according to the invention, the total process time of a system which executes a plurality of processes can be shortened.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An information processing method for an information processing system which executes a plurality of processes by executing each process by using output data of a preceding process as input data, said method comprising steps of:
    making the information processing system calculate a data error rate of input data of a specific process;
    making the information processing system read a data error rate allowable threshold value of the specific process from a memory storing a data error rate allowable threshold value of each process; and
    terminating the specific process of the information processing system if the calculated error rate is larger than the read data error rate allowable threshold value.

2. An information processing method according to claim 1, wherein if the error rate calculated during the specific process is equal to or smaller than the data error rate allowable threshold value, output data of the specific process is supplied as input data of a next process.

3. An information processing method according to claim 1, wherein the calculated data error rate is obtained from a predetermined number of data sets sampled from the input data.

4. An information processing method according to claim 1, wherein if there is an error in the input data in each process, a weight dependent upon contents of the error in the input data preset to the process is referred to and a result of incorporating the weight to the error is calculated as the number of errors.

5. An information processing control program for making an information processing system execute a plurality of processes by executing each process by using output data of a preceding process as input data, said program comprising instruction steps of:
    making the information processing system calculate a data error rate of input data of a specific process;
    making the information processing system read a data error rate allowable threshold value of the specific process from a memory storing a data error rate allowable threshold value of each process; and
    controlling the information processing system so as to terminate the specific process if the calculated data error rate is larger than the read data error rate allowable threshold value.

6. An information processing control program according to claim 5, wherein if the calculated data error rate of the specific process is equal to or smaller than the data error rate allowable threshold value, the information processing system is controlled so as to execute a next process by supplying output data of the specific process as input data of the next process.

7. An information processing control program according to claim 5, wherein the calculated data error rate is obtained from a predetermined number of data sets sampled from the input data.

8. A method of making an information processing system execute a series of processes, the information processing system executing the series of processes by executing each process by using output data of a preceding process as input data, said method comprising steps of:
    setting a process allowable threshold value relative to a data error rate of input data in each process;
    calculating the data error rate of input data of a specific process;
    selecting a set allowable threshold value corresponding to the specific process from the selected set allowable threshold values and comparing the calculated data error rate of the specific process with the selected set allowable threshold value; and invalidating the specific process in response to a comparison result indicating that the calculated data error rate of the specific process exceeds the selected set allowable threshold value.

9. A method according to claim 8, wherein output data of the specific process is passed to a next process as input data in response to a comparison result indicating that the calculated data error rate of the specific process is equal to or smaller than the corresponding threshold value.

10. A method according to claim 8, wherein the data error rate of the specific process is calculated from a predetermined number of data elements sampled from the input data of the specific process, end the calculated data error rate is defined as an estimated data error rate.

11. A method according to claim 10, wherein the specific process is invalidated in response to a comparison result indicating that the estimated data error rate of the specific process is equal to or lower than the corresponding process allowable threshold value and that the calculated data error rate of non-sampled data elements is larger than the corresponding process allowable threshold value.

12. A method according to claim 10, wherein an output of the specific process is validated in response to a comparison result indicating that the estimated data error rate of the specific process is equal to or lower than the corresponding process allowable threshold value and that the calculated data error rate of non-sampled data elements is equal to or smaller than the corresponding process allowable threshold value.

13. A method according to claim 8, wherein said step of calculating the data error rate comprises the steps of:
setting weighting data dependent upon contents of an error to each element of input data of each process and storing the weighting data; and
referring to the stored weighting data and weighting the error of each element of processed data of the input data to calculate the data error rate of the input data.

14. An information processing method for a cyber shopping site system having a server, providing clients for providing merchandise and service information and purchasing clients respectively connected to the server, and a database for storing the merchandise and service information, said information processing method executing a process by using output data of a preceding process by the server as input data, and comprising the steps of:
setting a process allowable threshold value relative to a data error rate of input data in each process;
calculating the data error rate of input data of a specific process;
selecting a set allowable threshold value corresponding to the specific process from the selected set allowable threshold values and comparing the calculated data error rate of the specific process with the selected set allowable threshold value; and
outputting information representative of invalidation of the specific process and notifying the invalidation to an input data source or the providing client in response to a comparison result indicating that the calculated data error rate of the specific process exceeds the selected set allowable threshold value.

15. A method according to claim 14, wherein the specific process is one of a plurality of processes of registering the merchandise and service information provided by the providing client in the database.

16. A method according to claim 14, wherein each process registers me merchandise and service information provided by the providing client as the input data in the database in the form of a plurality of records.

17. A computer-implemented program for implementing an information processing method for a cyber shopping site system having a server, providing clients for providing merchandise and service information and purchasing clients respectively connected to the server, and a database for storing the merchandise and service information, said information processing method executing a process by using output data of a preceding process by the server as input data, and comprising the steps of:
setting a process allowable threshold value relative to a data error rate of input data in each process;
calculating the data error rate of input data of a specific process;
selecting an allowable threshold value corresponding to the specific process from the set threshold values and comparing the calculated data error rate of the specific process with the threshold value; and
outputting information representative of invalidation of the specific process and notifying the invalidation to an input data source or the providing client in response to a comparison result indicating that the calculated data error rate of the specific process exceeds the selected allowable threshold value.

18. A cyber shopping site system implemented by a server including providing clients for providing merchandise and service information and purchasing clients respectively connected to the server, and a database for storing the merchandise and service information, said server executing a process by using output data of a preceding process as input data, comprising:
means for setting a process allowable threshold value relative to a data error rate of input data in each process;
means for calculating the data error rate of input data of a specific process;
determining means coupled to said setting means and said calculating means for selecting a process allowable threshold value corresponding to the specific process from the set threshold values and comparing the calculated data error rate of the specific process with said selected threshold value; and
output means responsive to said determining means outputting information representative of invalidation of the specific process and notifying the invalidation to an input data source or the providing client in response to a comparison result indicating that the calculated data error rate of the specific process exceeds the selected allowable threshold value.

* * * * *